July 8, 1924.

H. E. BJORLIN

BREAD SLICING MACHINE

Filed Oct. 15, 1923

1,500,434

Inventor
Harold E. Bjorlin,
Geo. Stevens.
By
Attorney

Patented July 8, 1924.

1,500,434

UNITED STATES PATENT OFFICE.

HAROLD E. BJORLIN, OF DULUTH, MINNESOTA.

BREAD-SLICING MACHINE.

Application filed October 15, 1923. Serial No. 668,529.

*To all whom it may concern:*

Be it known that I, HAROLD E. BJORLIN, citizen of the United States, residing at Duluth, in the county of St. Louis and State of Minnesota, have invented certain new and useful Improvements in Bread-Slicing Machines, of which the following is a specification, reference being had therein to the accompanying drawing.

This invention relates to bread slicing machines and has special reference to that type of machine illustrated in my United States Patent No. 1,420,235 dated June 20, 1922, wherein a bread feeding endless belt is superimposed above a longer tray carrying endless belt and feeds loaves of bread under an intermittently reciprocal slicing knife, whence the slices fall by gravity into the trays carried by the lower endless belt.

The principal object of my present invention is to provide certain movements in the way of bread feeding and controlling devices which renders such a machine more efficient.

Other objects and advantages of the invention will appear in the further description thereof.

Referring now to the accompanying drawing forming part of this application and in which like reference characters indicate like parts:

Figure 1:
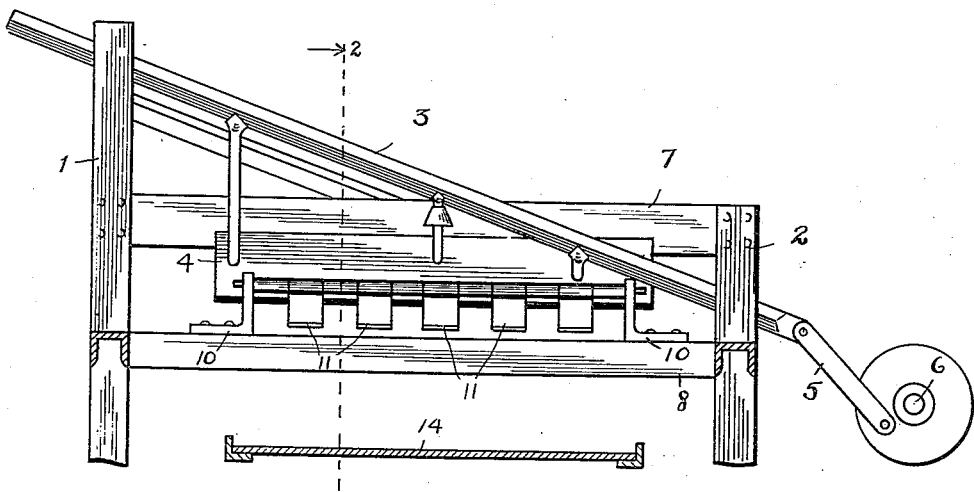
Figure 1 is a transverse sectional view through a bread slicing machine as above referred to looking towards the slicing knife.

1 and 2 represent the side uprights of the centermost section of the slicing machine frame, through which the knife carrying pitman 3 is obliquely mounted; the knife being rigidly suspended therefrom. The pitman 3 is reciprocated in any desired manner as for example by the link connection 5 with the rotating shaft 6. 7 and 8 represent cross-members preferably of angle iron which form part of the frame structure of the machine, the member 8 forming the bed under the knife 4, over which the bread passes during the slicing operation.

On this member 8 and in front of the knife 4 is mounted a small shaft 9 in the two upright angle brackets 10 and swingingly depending from this shaft are a plurality of spaced slice engaging members or friction shoes 11, they being individually free to swing by gravity. The object of these shoes is to contact the upper surface of the slices of bread as they are advanced over the member 8, as clearly shown in Figure 3 of the drawings; this being for the purpose of causing a slight frictional contact of the cut slices against the end of the loaf so that the last slice being cut is less liable to be squashed, but does not prevent the slices previously cut being moved along and falling down the inclined apron 12 to the trays 13 as they are carried along upon the endless belt 14.

Just back of the knife 4 is rotatably mounted the small roller 15 it being carried in angle brackets 16 at either end thereof, they being slotted as at 17 to permit of the small axle 18 of the roller to move up and down within the slots.

This roller is designed to engage the top of the loaves as they pass thereunder and in addition to the weight of the roller I provide a small contractile spring 19 at either end thereof attached to the foot of the bracket or the bed 8 as the case may be to cause the roller to more firmly engage the loaves; this being for the purpose of preventing the loaves being raised by the upward motion of the knife as they frictionally engage same.

Figures 2, 3:
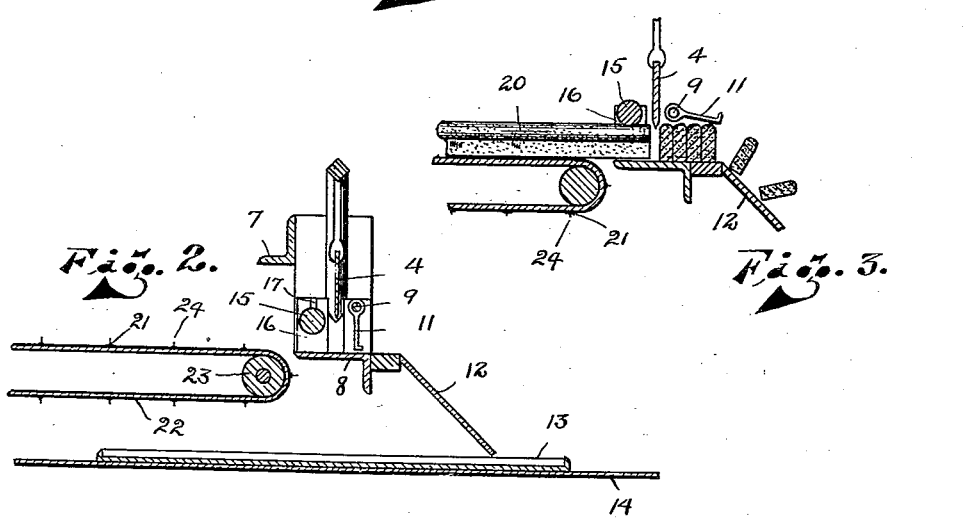
Figure 2 is a vertical section taken at right angles to Figure 1 and on the line 2—2.
Figure 3 is a similar section to Figure 2 showing bread being sliced.
Figure 4:
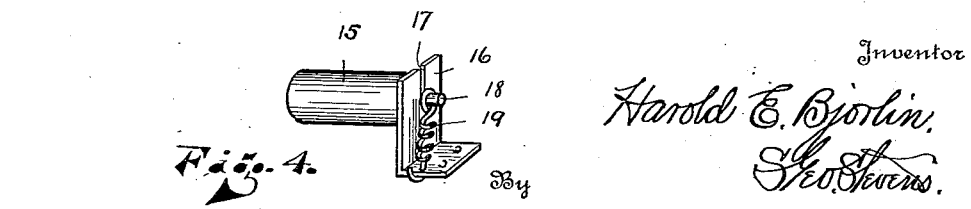
Figure 4 is an enlarged perspective view of the bread contacting roller.

In Figure 3 a loaf of bread 20 is illustrated as passing under the roller, it being understood that the full width of the machine is ordinarily filled with loaves when in operation.

As a further means for accurate feeding of the loaves to the knife I provide a plurality of transverse metal strips 21 on the endless feeding belt 22 which is carried upon rollers as shown at 23. These metal strips have spaced sprigs 24 extending upwardly therefrom so that when the loaves of bread are placed upon the belt the sprigs slightly puncture same and prevent slipping backwardly of the loaves, the same materially improving the feeding properties of the machine.

Having thus described my invention, what I claim and desire to secure by Letters Patent, is:

1. The combination with a bread slicing machine having a reciprocable knife for slicing loaves of bread, of a shaft, adjacent the knife, carrying gravity means for holding a number of slices in close juxtaposition to the knife for the purpose described.

2. In a bread slicing machine having a reciprocable knife for slicing loaves of bread as they pass over a fixed bed, a vertically reciprocable roller adjacent the knife above the bed for holding the loaves tightly to the latter, and a shaft upon the opposite side of the knife carrying a plurality of pendulum-like gravity members for holding a number of slices in close juxtaposition with the knife, the bread engaging members on either side of the knife cooperating to cause the latter to make a clean cut of the bread.

In testimony whereof I hereunto affix my signature in the presence of two witnesses.

HAROLD E. BJORLIN.

Witnesses:
S. Geo. Stevens,
S. C. Bronson.